United States Patent [19]

Roge et al.

[11] 4,112,481

[45] Sep. 5, 1978

[54] MINIATURE MULTI-IMPEDANCE TRANSFORMER MODULE

[75] Inventors: Ralph R. Roge, Lemont; Mark S. Ziermann, Bolingbrook; Anthony J. Wilkis, Downers Grove, all of Ill.

[73] Assignee: Wescom, Inc., Downers Grove, Ill.

[21] Appl. No.: 793,942

[22] Filed: May 5, 1977

[51] Int. Cl.[2] .................................. H02B 1/18

[52] U.S. Cl. .................................. 361/395; 361/380; 361/352; 336/96

[58] Field of Search .................. 179/1 PC, 170 G; 361/331, 352, 380, 392, 395, 416; 174/52 PE; 336/96, 107

[56] References Cited

U.S. PATENT DOCUMENTS

| | | | |
|---|---|---|---|
| 2,802,970 | 8/1957 | Guernsey | 361/380 |
| 3,161,843 | 12/1964 | Hodges | 336/96 |
| 3,175,179 | 3/1965 | Trump | 361/352 |
| 3,699,394 | 10/1972 | Schuler | 174/52 PE |
| 3,860,767 | 1/1975 | Boucher | 178/45 |

*Primary Examiner*—Gerald P. Tolin

*Attorney, Agent, or Firm*—Leydig, Voit, Osann, Mayer & Holt, Ltd.

[57] ABSTRACT

A miniature multi-impedance transformer module specially adapted for use in telephony. In the preferred embodiment a pair of multi-winding transformers and a coil are configured to have connecting pins projecting both above and below the bodies thereof. The upward projecting pins are inserted in a printed circuit board carrying a plurality of connectors in a predetermined array. This assembly is installed in a miniaturized case and potted in place with the lower projecting pins extending below a mounting surface of the case. The lower surface and the downward projecting pin are adapted for ready mounting on a second printed circuit board. The connectors at the top of the module receive shorting plugs for selectively connecting the windings of the transformers and coil to provide impedance matching in telephone equipment. The miniaturized board mounted modules are readily adapted for high density rack mount applications.

7 Claims, 6 Drawing Figures

MINIATURE MULTI-IMPEDANCE TRANSFORMER MODULE

This invention relates to telephony, and more particularly to a miniaturized multi-impedance transformer module used in telephony, such as for hybrid terminating sets or equalizers.

The telephone industry uses numerous transformers for purposes such as impedance matching, four wire to two wire conversion, equalization, and the like. Packaging of these transformers for installation in systems has been accomplished in a variety of ways. Frequently, the transformers are relatively large and are mounted on metallic chassis, which must be wired into equipment frames. Sometimes one or more of these transformers are mounted on a printed circuit board for plug-in installation in the equipment frame. When it is necessary to provide options in a particular piece of equipment, such as selectable impedances or units with or without holding coils, it is conventional to provide a family of equipment types spanning the field of necessary options. While it would be desirable to provide a single piece of equipment having sufficient selectability to meet the needs of an entire family of devices, this need has not, heretofore, been economically filled.

In view of the foregoing, it is a general aim of the present invention to provide a miniaturized multi-impedance transformer module for use in telephony, easily mountable on a printed circuit board, and having readily accessible means for switching the characteristics of the module to meet a variety of needs.

It is a detailed object of the invention to provide such a multi-impedance transformer module having miniaturized transformers connected to a printed circuit board, the board carrying selector means for providing selective interconnection of the transformer windings, the board and transformers being potted within a case from which leads of the transformers project for making connection with and mounting upon a second printed circuit board.

Thus, it is an aim of the present invention to provide a miniaturized multi-impedance transformer module, economical to manufacture, and capable of high density rack mounting.

Other objects and advantages will become apparent from the following detailed description, when taken in conjunction with the drawings, in which.

While the invention will be described in connection with certain preferred embodiments, there is no intent to limit it to those embodiments. On the contrary, the intent is to covr all alternatives, modifications and equivalents included within the spirit and scope of the invention as defined by the appended claims. In that regard, terms such as top and bottom will be used in the specification and claims for convenience in setting a frame of reference within the module, and are not to be taken as requiring any particular orientation of the module in space. Indeed, in most rack mount applications, in order to allow cooling air flow through the rack, the printed circuit boards will be mounted on end, orienting the surfaces referred to herein as top and bottom in horizontal planes.

Figure 1:
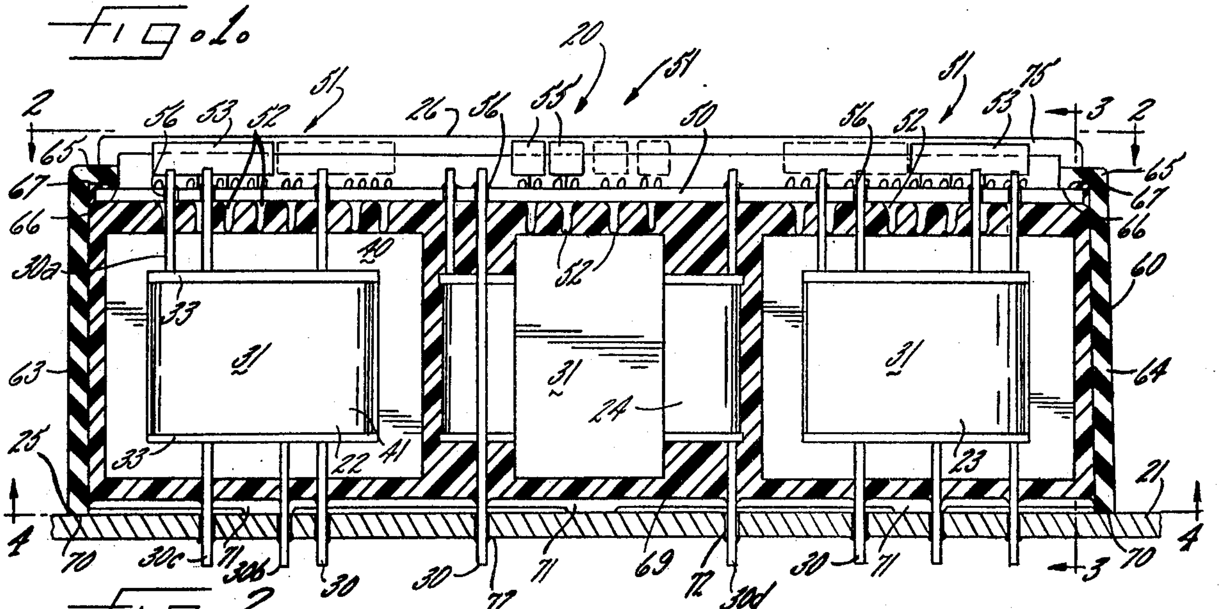
FIG. 1 is a sectional view in elevation showing a miniaturized multi-impedance transformer module exemplifying the present invention.
Figure 2:
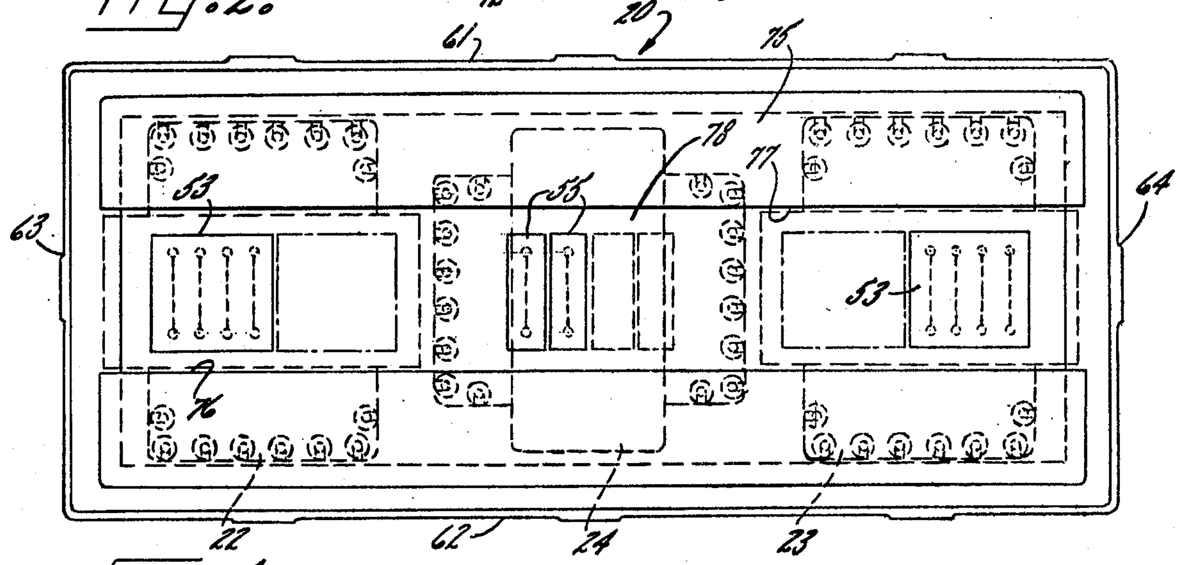
FIG. 2 is a plan view of the module taken along the lines 2—2 of FIG. 1.
Figure 3:
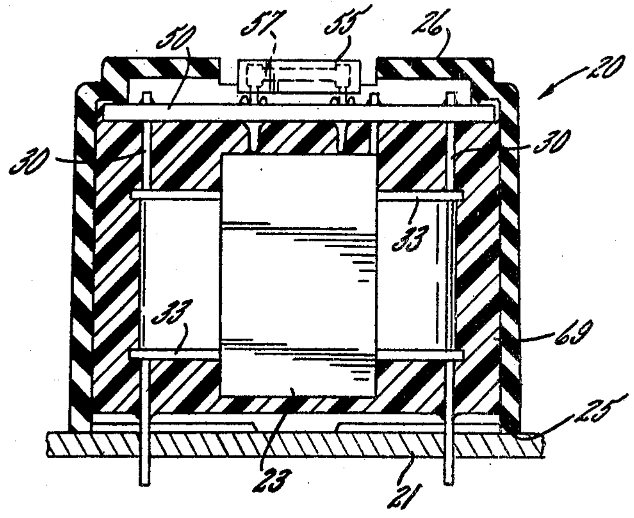
FIG. 3 is a sectional view taken along the lines 3—3 of FIG. 1.
Figure 6:
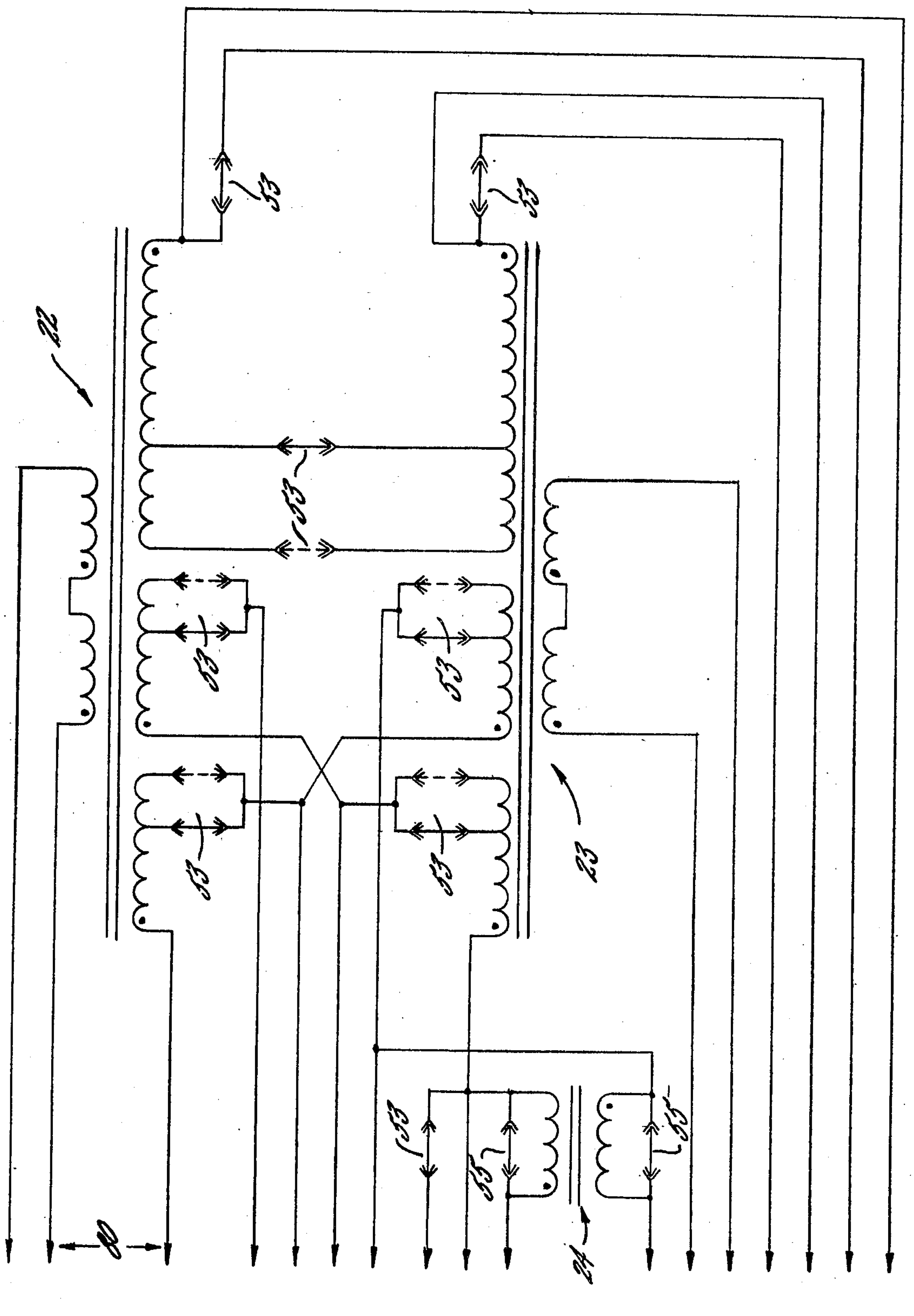
FIG. 6 is a circuit diagram illustrating the electrical connections for configuring the module of FIG. 1 as a four wire terminating set with holding coil.

Turning now to the drawings, there is shown in FIGS. 1–4 a miniaturized multi-impedance transformer module, generally indicated at 20, the module in FIGS. 1 and 3 shown mounted on a printed circuit board 21. The unit houses a plurality of magnetic devices, the illustrated embodiment including a pair of transformers 22, 23 and a coil 24. Depending on the characteristics of the magnetic devices and the electrical connections made therebetween, the unit may function as a hybird termination set (as illustrated in FIG. 6), an equalizer, or other such device requiring magnetic elements. The unit has a base 25 suitable for printed circuit mounting, and opposed thereto, a top 26 allowing access to selector means to be described below.

In practicing the invention the transformers and coil are configured to provide electrical and mechanical connections both to module itself for selectively interconnecting the magnetic circuitry, and also to the printed circuit board or the like on which the module is to be mounted. To that end, each magnetic element carries a plurality of connector pins 30, at least some of such pins projecting both above and below the body 31 of the device. The pins are electrically connected to the windings and taps of their associated magnetic device so that electrical connection can be made to such windings and taps via the pins. In certain circumstances it is also desirable to provide additional "dummy pins" mechanically but not electrically connected to the magnetic elements. To establish and maintain a predetermined spacing between pins, the upper and lower flanges 33 of the coil forms may be notched to receive the pins.

Figure 4:
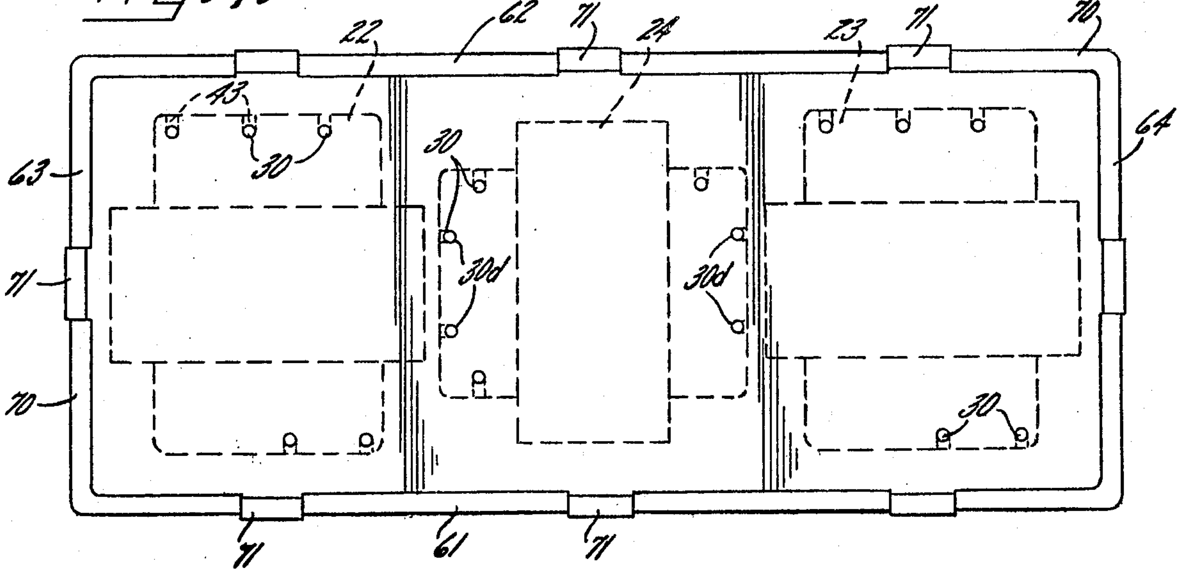
FIG. 4 is a bottom view taken along the lines 4—4 of FIG. 1.

Referring in greater detail to the magnetic elements, and taking the transformer 22 as exemplary, it is seen that the body 31 includes a conventional magnetic core 40 carrying a plurality of windings 41. The aforementioned flange 33 of the coil form contain the windings centrally of the core. As suggested in FIG. 4, the flanges 33 are notched as at 43 to locate the connecting pins 30. FIG. 2 illustrates the situation wherein the maximum contingent of connecting pins is provided. It is noted, however, that not all of such pins need be provided in every instance. This is illustrated in FIG. 1 wherein certain pins, such as 30*a* project only above the transformer body, other pins 30*b* project only below the transformer body, while still other pins 30*c* project both above and below the transformer body. It is desirable to extend only the number of pins needed to make the necessary electrical connections and provide the necessary mechanical rigidity below the module in order to minimize the complexity of the layout of the mother board on which the module is to be mounted. This is illustrated in FIG. 4 which shows only those pins which project below the module when configured as a hybird termination set, the circuitry of which will be described in connection with FIG. 6.

Typically, the majority of the connecting pins are electrically connected to the respective windings of the associated magnetic elememts, and extend upwardly, downwardly, or both upwardly and downwardly, depending on where the winding is to be connected. In the illustrated embodiment, the coil 24 carries four "dummy pins" 30*d* which extend both upwardly and downwardly, but are not electrically connected to windings of the coil. The pins 30*d* electrically connect the circuit board 50 to the mother board 21, for carrying signals from the circuit board 50 to circuitry exterior of the module.

In practicing the invention, the pins which project above the magnetic elements are electrically and mechanically connected to the module, in the first instance by virtue of connection between the pins and an upper circuit board 50. The circuit board 50 not only provides mechanical support for the magnetic elements and electrically interconnects the various windings thereof, but also carries selector means, generally indicated at 51, for selectively switching the characteristics, such as impedance, of the magnetic elements. In addition, the circuit board 50 may carry other electrical or electronic components, such as resistors, capacitors, transistors or the like, to suit the needs of a given application. In effect, the circuit board 50 doubles the effective part area of the mother board, replacing the area lost on the mother board with comparable mounting space for additional components.

Figure 5:
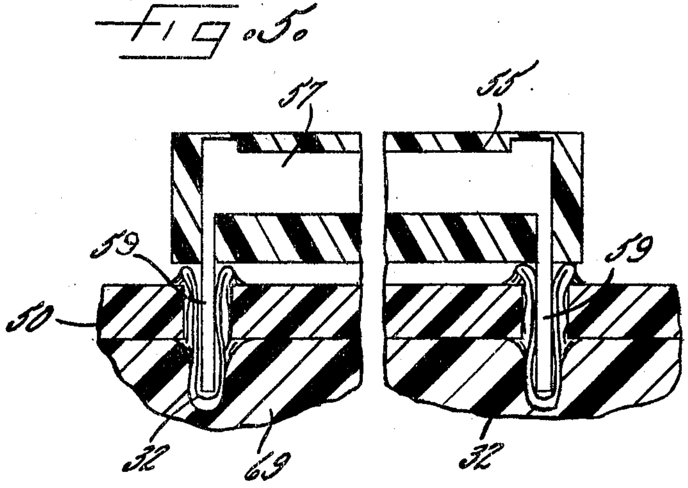
FIG. 5 is a partial sectional view showing the interrelationship between the plug and connector.

Referring to the selector means 51, in the preferred embodiment such means comprises a patterned array of connectors 52 on the circuit board 50 cooperating with program plugs 53, 55 for selectively interconnecting the windings of the magnetic elements. The connectors 52 are inserted in apertures in the circuit board 50, the apertures being arranged in a predetermined pattern so that the connectors mate the pins of the program plugs. As shown in greater detail in FIG. 5, the individual connectors are cylindrical in nature, are inserted in the circuit board 50 in apertures provided therefor, are soldered in place, and provide a cylindrical recess having an aperture above the board for receiving a pin 59 of the program plug. In the illustrated embodiment, the program plug, when in place, serves to electrically connect the individual pins in a pair, a shorting connection 57 being provided for that purpose. The plugs 53 each carry four of such shorting connections, while the plugs 55 each include a single shorting connection. Referring again to FIGS. 1 and 2, there are illustrated the alternate positions for the program plugs. The plugs 53 are shown in solid lines in a first or 600 ohm position, providing connections for the four pairs of contacts at the extremes of the arrays. With the program plugs moved to the alternate positions illustrated in dashed lines, the module is programmed for 900 ohms operation, similarly connecting the contacts in the four pairs innermost in these arrays. The holding coil has only eight connectors in the array provided therefor, and utilizes two single position shorting plugs 54 which, in the left position illustrated in solid lines removes the holding coil from the circuit, and in the right position illustrated in dashed lines inserts the holding coil in the circuit.

As a convenient means for locating the magnetic elements with respect to the circuit board 50, the upper surfaces of the magnetic elements may be placed in contact with the lower surfaces of the connector pins 52 before the leads 30*a*, 30*c* projecting above the transformers are inserted into apertures 56 in the circuit board 50 and soldered. In this case, it is necessary to take steps to assure that the transformer case does not short the connectors together. Conveniently, this is accomplished by wrapping the exteriors of the bodies of the magnetic elements with an insulating tape.

In assembling the device, the printed circuit board carrying the appropriate foil pattern and apertures is first produced. Then the connectors 52 are inserted in the appropriate apertures and soldered in place. Following this, the transformers and other magnetic elements are physically positioned with respect to the circuit board by inserting the leads 30*a*, 30*c* through the apertures 56 provided therefor. The transformer leads are soldered in place, making both mechanical and electrical connections to the circuit board 50. This arrangement is used as the basis for a module, the exterior of which is defined by a case 60, typically in the form of a thermo-plastic molded housing. The housing 60 has continuous side walls 61, 62 and end walls 63, 64, such walls being flanged as generally indicated at 65 to form a seat for the printed circuit board 50. Preferably the flange 65 carries a slight protrusion 66, thereby to form a recess 67 into which is deposited a glyptal resin before insertion of the printed circuit board to form a seal for the potting operation. The board with mounted transformers is inserted into the housing in inverted fashion from that illustrated in FIG. 1, following which the elements are potted in place by means such as a conventional epoxy potting compound 69 poured into place. The walls 61–64 of the housing 60 terminate in a base portion 70 defining the plane 25 which will seat against a mother board when the module is mounted thereon. Care is taken to assure that the epoxy 69, while encasing all of the elements, does not project below the lower surface of the housing which forms the mounting base. Conveniently the base 70 is formed with a plurality of individual feet 71 to provide relieved apertures between the module and the mother board, allowing the introduction of cleaning solvent or the like to remove solder flux after the module is mounted on the mother board.

It is desirable, although not essential, especially in high density applications to provide an upper surface 75 on the case rising from the flanges 65. As best illustrated in FIG. 2, the upper surface 75 includes a pair of rails 76, 77 encompassing a central access opening 78 which allows access to the transformer selectors 53, 55. This not only serves to protect the program plugs, but to assure that the plugs are properly seated, the upper surfaces thereof being below the top of the case 75 so that the plugs will not be dislodged when the mother board carrying the module is inserted into a card file.

As a result of the potting operation, the circuit board 50 with mounted magnetic elements is securely fixed within the case 60, with the leads 30*b*, 30*c* of the magnetic elements projecting below the mounting surface 70 in a predetermined pattern. Such predetermined pattern is assured by the relatively short lead length projecting beyond the epoxy potting compound and below the mounting surface 70. Thus, the mother board 21 may be drilled in accordance with the predetermined pattern, and carry the appropriate conductor pattern to interconnect the module for the intended purpose. The module is seated on the mother board, with the leads 30*b*, 30*c* through the appropriate apertures 72, the base surface 70 seating on the upper surface of the board. The leads 30*b*, 30*c* are then soldered in place, forming electrical connections to both the magnetic elements and the circuitry carried by the circuit board 50, and mechanically affixing the module 20 to the mother board 21.

The mother board 21 may carry a single module 20 and additional circuitry associated therewith, or alternatively may carry a plurality of such modules. The fact that a single module may replace an entire family of devices is illustrated by the terminating set application, wherein the selector means allows the single module to be simply set up to operate into 600 ohm two wire ports, 900 ohm two wire ports and either with or without a holding coil associated with the A and B leads. This flexibility is illustrated in the circuit diagram of FIG. 6, which shows the transformers 22, 23 and diagrammatically illustrates the windings and taps thereon. The electrical connections to the coils are made by the connector pins, while the remaining interconnections, with the exception of those made by dummy pins **30*d*, are made by way of the conductor pattern on the printed circuit board 50. The terminals 80 represent the connector pins projecting below the module for connection to a mother board. The selector means 53 associated with the transformers 22, 23 are illustrated in solid lines in the 600 ohm position (illustrated by the solid line placement of the program plug 53 in FIG. 1). With the program plugs 53 switched to the opposite position, the selector means completes the dashed line connections, thereby setting up the module for 900 ohm operation. The holding coil 24 is also illustrated with its associated selector means 55, in the solid line position serving to short the holding coil windings to remove them from the circuit. With the plugs 55** moved to the alternate position, the connections are opened, thereby inserting the holding coil into the circuit. The extreme flexibility achieved by the miniature module will now be apparent.

To give some appreciation of the size reduction achieved by the module, typical dimensions will be given for a practical terminating set, the circuitry of which is illustrated in FIG. 6. The individual magnetic elements 22, 23, 24 were about 0.75 inch high, and about 1 inch by 1 inch in plan. Each transformer carried 11 pins, disposed on the two sides thereof, and spaced on 0.125 centers. The holding coil carried four pins disposed on two sides and four dummy pins, spaced on 0.125 centers. The overall module was about 3.5 inches in length, about 1.5 inches in width, and rose above the printed circuit board on which it was mounted by about 1.2 inches. Thus, the unit occupied only about 5.25 square inches of printed circuit board space, and allowed relatively dense printed circuit board packing, requiring only about 1.25 inches between boards. The improvement over conventional terminating sets will be apparent to those skilled in this art.

We claim as our invention:

1. A miniature multi-impedance transformer module comprising at least two transformers having windings and impedance changing taps, connector pins mechanically connected to said transformers, at least some of the connector pins being electrically connected to respective ones of said windings and taps, at least some of the connector pins extending both above and below the transformers, a printed circuit board having apertures receiving the pins projecting above the transformers, selector means on the printed circuit board connected to at least some of the pins for selectively connecting said windings and taps to program the impedance characteristics of said module, a miniaturized enclosure having an open base for receiving the printed circuit board and transformers and an open top for allowing access to the selector means, means potting the printed circuit board and transformers in place in said enclosure with some of said pins extending below the transformers and projecting below said base for electrical and mechanical connection to a second printed circuit board.

2. The module as set forth in claim 1 further including a coil having a winding thereon, additional connector pins mechanically joined to said coil and electrically connected to said winding, at least some of said additional connector pins extending both above and below the coil, said printed circuit board having apertures for receiving the pins projecting above the coil, second means on the printed circuit board connected to said last mentioned pins for switching said coil into and out of the circuit of said module.

3. The module as set forth in claim 2 wherein said module comprises a four wire terminating set with holding coil, said transformer means comprising first and second transformers for performing four wire to two wire conversion, the two wire of said transformers having 600 ohm and 900 ohm taps, said taps being connected to said selector means for selection thereby, said coil comprising a holding coil switchable into and out of said terminating set by said second selector means.

4. A miniature multi-impedance transformer module comprising a printed circuit board, connector means inserted through apertures in said printed circuit board in a predetermined pattern and affixed thereto, said connector means having plug receiving recesses above said printed circuit board and protrusions below same, miniature transformer means having a plurality of windings, connector pins mechanically connected to said transformer means and electrically connected to said windings, at least some of said connector pins projecting both above and below said transformer means, said printed circuit board having apertures for receiving the pins projecting above said transformer means, said transformer means being installed on said printed circuit board with the last mentioned pins projecting through said apertures and a surface thereof supported on said protrusions, insulation means between said protrusions and said surface, said last mentioned pins being soldered to said printed circuit board, a case having an open bottom and walls defining a base, said printed circuit board with mounted transformer means being inserted into said case with said leads projecting below said transformer means projecting below said base, means potting said printed circuit board and transformer means in place in said case whereby said last mentioned pins form electrical and mechanical mounting means for said module, and program plug means selectively insertable into said connector means for selectively interconnecting the windings of said transformer means.

5. The module as set forth in claim 4 wherein said case further includes an extension rising above said printed circuit board and encompassing said program plug means, and apertures in the top of said extension for allowing access to said program plug means.

6. The module as set forth in claim 4 wherein said transformer means includes two transformers for performing four wire to two wire conversion, said transformers having windings for matching 600 ohm and 900 ohm two wire circuits, said program plug means selectively interconnecting said windings for matching the 600 ohm or 900 ohm circuits.

7. The module as set forth in claim 6 further including a holding coil, additional said connector means in a second predetermined array for mating second program plug means, said holding coil having a winding, second connecting pins mechanically attached to said holding coil and electrically connected to said winding, at least some of said second connecting pins extending both above and below said holding coil, said printed circuit board having apertures for mating the pins extending above said holding coil, said holding coil being installed on said printed circuit board with said last mentioned pins through said apertures and a surface thereof supported on the protrusions of said second predetermined array of connecting means, said holding coil being potted in place with said first and second transformers thereby to form a four wire terminating set with holding coil.

* * * * *